Feb. 6, 1934.    H. F. HOLTZ    1,945,810
PAVEMENT CRACK CLEARING DEVICE
Filed June 20, 1932
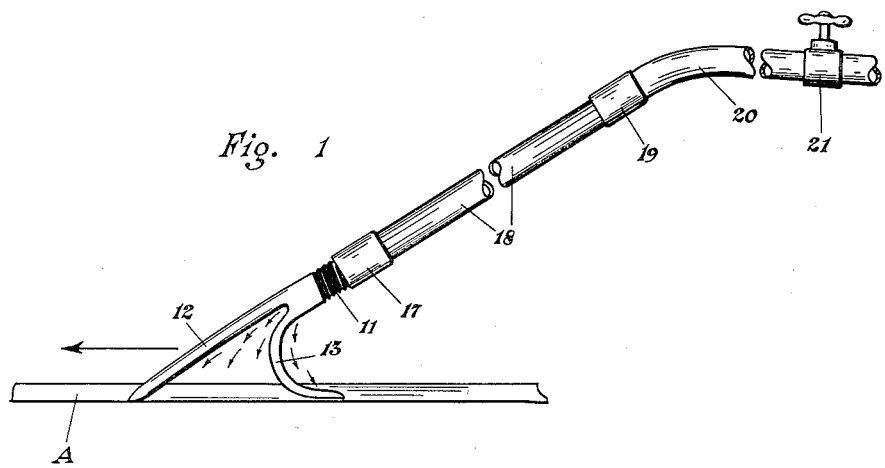
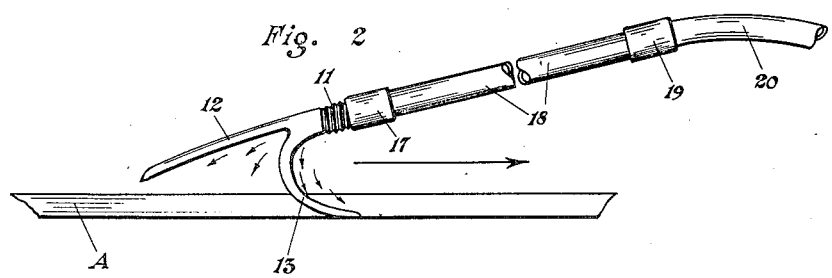
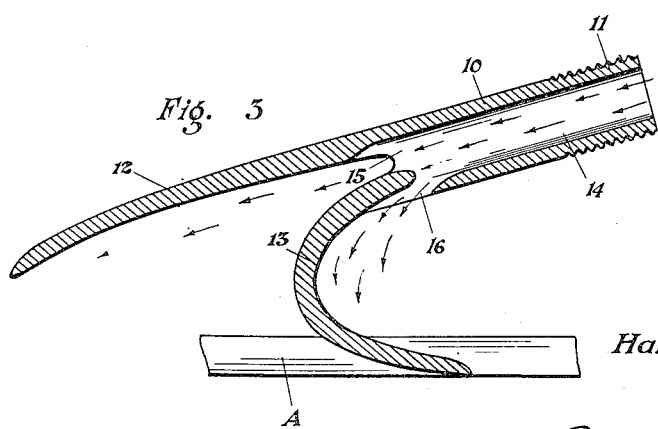
Inventor
Harold F. Holtz
By Emil F. Lange
Attorney Patented Feb. 6, 1934

1,945,810

UNITED STATES PATENT OFFICE 1,945,810

PAVEMENT CRACK CLEARING DEVICE

Harold F. Holtz, Lincoln, Nebr.

Application June 20, 1932. Serial No. 618,202

3 Claims. (Cl. 15—20)

My invention relates to crack clearing devices for removing debris from the cracks of paving, sidewalks or walls preparatory to filling the cracks.

One object of the invention is the provision of a device which combines a prod with an air blast whereby the air blast will not only remove the debris which is loosened by the prod but which will also assist the prod in loosening the debris.

Another of my objects is the provision of a crack clearing device which can be operated in both a forward and a rearward direction to loosen the debris in the cracks.

Another of the objects of my invention is the provision of a pair of prods, one of which functions as a runner for the other prod.

Another object which I have in view is the provision of push and pull prods having an air blast in combination therewith and so arranged that the air blast will supplement the work of either prod.

Having in view these objects and others which will be pointed out in the following description, I will now refer to the drawing, in which Figure 1 is a view of my device in the position which it occupies in its forward direction of movement.

Figure 2 is a view of the same device showing the position in its rearward movement.

Figure 3 is a view of the crack clearing device as seen in longitudinal section.

Pavements, sidewalks, floors and walls of plastic material, especially when their construction is defective, develop cracks which accumulate debris. This debris becomes compacted in the cracks and under the pressure of traffic it develops great lateral pressure against the sides of the cracks thus tending to increase the width of the cracks. This debris is also more or less water absorbent which produces further trouble in the case of outside structures such as pavements, sidewalks and outside walls. The water in the debris freezes and this in turn will ruin the structure. The usual remedy for this trouble is to clear the cracks and to then fill them with a water repellent or water resistant material to thus preserve the structure as a whole.

The usual tools employed in clearing cracks are improvised and their use does not give satisfactory results besides being of such a nature that the labor cost of clearing the cracks is excessive. Such tools usually consist of simple prods which are supplemented by the use of brushes for removing the debris. Occasionally a prod is used and its use is followed by an air blast used as a separate tool. When either the brush or the air blast are thus used, much of the debris either remains lodged in the cracks or it is blown back into the cracks before they can be filled.

The present device, as best shown in the sectional view in Figure 3, includes a shank 10 having a screw threaded end portion 11. Forward of the shank 10 and integral therewith are two prongs 12 and 13, the prong 13 is abruptly curved first forwardly and downwardly and then rearwardly and downwardly. The shank 10 has a bore at 14 with an outlet 15 underneath the prod 12 and an outlet 16 underneath the prod 13.

The device shown in Figure 3 is adapted to be connected to a source of air under compression, the connections being thus shown in Figures 1 and 2. A screw threaded collar 17 is secured to the shank over the threaded portion 11 of the shank. The collar 17 is connected to the handle 18 which in turn is provided with a collar 19 for attachment to a flexible connection 20 for conducting air under pressure. For the convenience of the operator the device may also be provided with a valve 21 for turning on or shutting off the air, either manually or automatically.

In all of the figures the device is shown as seated in the crack A of the paving or other structure. In the Figure 1 view the prod 12 is the operative prod for releasing the debris. This requires that the handle 18 be pushed by the operator in a forward direction as indicated by the arrow in that figure. In this position the point of the prod 12 rests in the bottom of the crack A while the prod 13 is in such position that the prod 12 will maintain a substantially fixed inclination to the surface of the paving. The prod 13 thus serves as a runner for the crack clearing device while the device is being pushed forwardly. The compressed air is forced out through the discharge opening 15 and against the point of the prod 12. The air thus loosens partly loosened particles immediately in the rear of the prod 12 and it blows all of the loosened particles out of the crack. This discharge of the loosened particles is simultaneous with the prodding action of the prod 12 so that if any particles remain adhering to the sides or bottom of the crack, their presence will become immediately apparent so that another push or pull of the device will loosen them. If a portion of the debris has a gradually sloping rear shoulder and an abrupt front shoulder, the device may be tilted in the position shown in Figure 2 and then pulled rearwardly in the direction of the arrow. This will loosen such particles which are then blown out from the crack by the air passing out through the discharge opening 16.

My device must not be confused with the hollow prods employed in certain other but non-analogous arts. A hollow prod would be almost useless for clearing compacted trash out of the cracks in concrete and similar surfaces. The thickness of the prod is, of course, governed by the width of the cracks and this necessarily limits the diameter of the prods. If such a prod is then provided with a bore, the thickness of the walls of the prod would cause the rapid wearing down of the prod. Besides this, the bore of the prod would tend to become clogged. The prod must be made of a material which is adapted to be tempered and hardened and it must be capable of being sharpened. This can be done only by making the prod solid in view of the limited diameter of the prod. In this connection it should also be noted that sharpening action to a certain degree takes place during the operation of the device. In the Figure 1 position, the point of the prod 13 is to a certain extent abraded by the concrete of the paving. This action takes place at the point and it tends to keep that point sharpened.

Having thus described my invention in such full, clear, and exact terms that its construction and operation will be readily understood by others skilled in the art to which it pertains, what I claim as new and desire to secure by Letters Patent of the United States is:

1. A pavement crack clearing device including a forwardly and downwardly inclined prod and a rearwardly and downwardly inclined prod whereby said first named prod will be operative in dislodging the debris in a crack when said device is pushed forwardly and said second named prod will be operative when said device is pulled rearwardly, and means for discharging streams of air against the rear sides of both of said prods and into the pavement crack during the operative movements of said device.

2. A pavement crack clearing device including a shank having a central bore and adapted for connection with a supply of air under pressure, a forwardly and downwardly inclined prod projecting from said shank, and a second prod projecting from said shank, said second prod being first forwardly and downwardly inclined and then rearwardly and downwardly inclined, the bore of said shank being provided with discharge orifices underneath the portions of said prods which are adjacent the junctions of said prods with said shank.

3. In combination, a forwardly and downwardly inclined hollow shank for conducting a stream of air, an elongated solid prod terminating at the forward or lower extremity thereof in a blunt point for entering cracks in pavements to loosen the debris in the cracks, said prod being in alignment with said shank, and a U-shaped solid prod projecting from said shank first in a forwardly and downwardly inclined direction and then in a rearwardly and downwardly inclined direction and adapted to function as a supporting runner for the first said prod during the forward movement thereof and to function to loosen debris during the rearward movement thereof, said shank being provided with apertures at the junctions of said two prods with said shank for directing streams of air against the rear sides of both of said prods.

HAROLD F. HOLTZ.